March 21, 1939. R. PETERSON 2,151,044
WORK HANDLING AND PREHEATING MECHANISM FOR WELDING
Filed Jan. 31, 1936 2 Sheets-Sheet 2
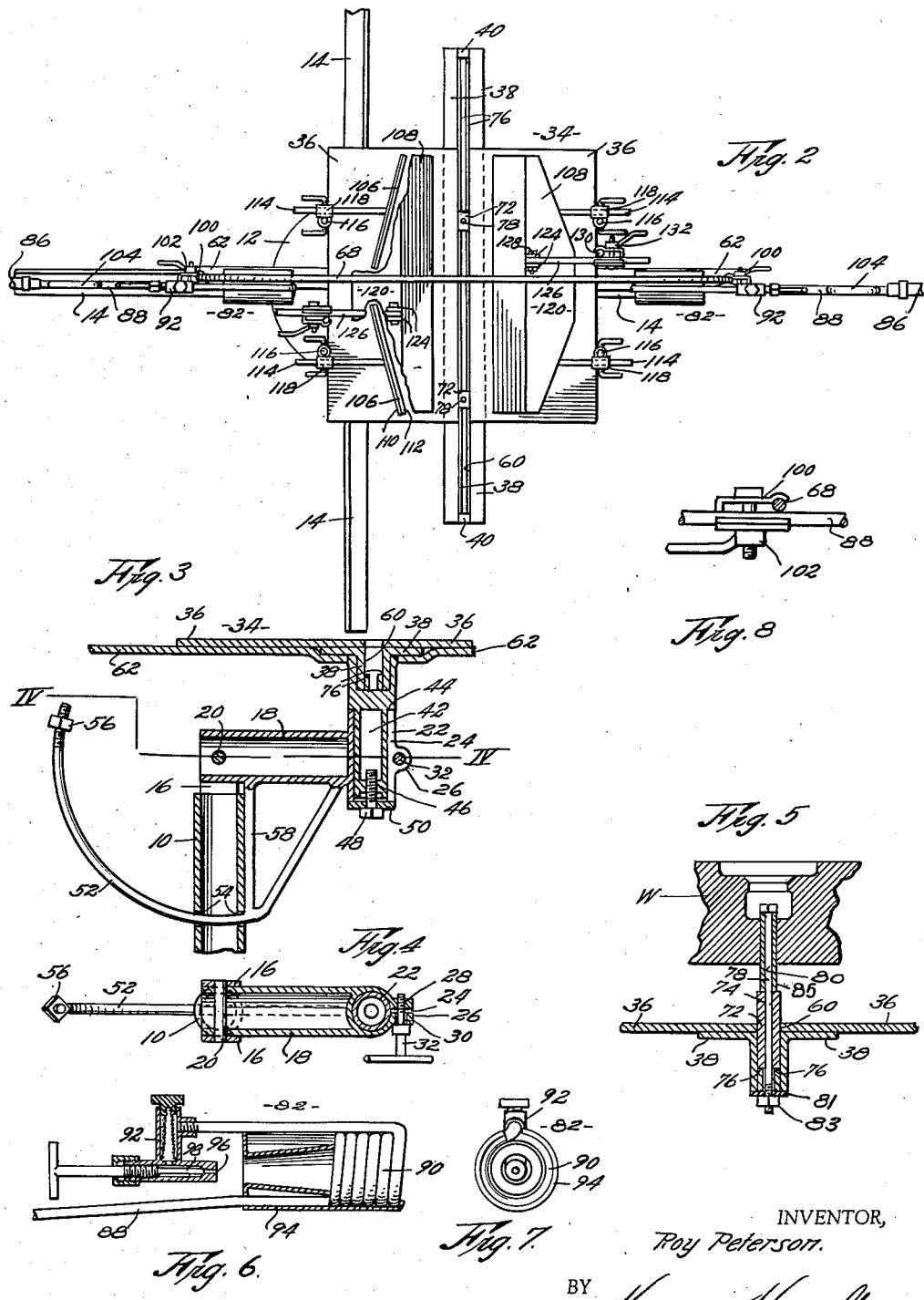
INVENTOR,
Roy Peterson.
BY Hovey & Hamilton
ATTORNEYS.

Patented Mar. 21, 1939

2,151,044

UNITED STATES PATENT OFFICE 2,151,044

WORK HANDLING AND PREHEATING MECHANISM FOR WELDING

Roy Peterson, Emporia, Kans.

Application January 31, 1936, Serial No. 61,650

7 Claims. (Cl. 113—99)

This invention relates to work handling and pre-heating mechanism for welding, and particularly to the handling and pre-heating of work, such as automobile engine heads, which should be positioned differently during the several welding operations.

It is a well known fact that in the welding of a piece of work having a fracture that extends to different surfaces, that best results are obtainable by positioning the particular surface, being welded, in a substantially horizontal position. For instance, should a cube be fractured across one face and into the adjacent opposite sides, each surface should be positioned in a substantially horizontal plane so that the welding could be done from the top side. This is accomplished by simply turning the block to present the desired surface in a horizontal position.

The pre-heating of the work, such as an automobile engine head, is normally accomplished by pre-heating the entire head and then welding the fracture when the head is removed from the heating means. The period of time for welding permits the work to gradually cool off, thereby setting up undesirable stresses and strains in the work which hinder the proper weld.

The present invention contemplates the provision of a mechanism whereby the work may be securely supported and moved to present each side to be welded in a substantially horizontal plane, and also the provision of pre-heating burners which will move with the work and maintain a constant heating effect on the work during the pre-heating and welding operation.

The principal object of the invention is the provision of a pre-heating and positioning mechanism comprising a support, an adjustable table carried by the support having means for securing the work in position, and having an arched burner support extending above and across the table, on which are adjustably mounted burners, adapted to direct a flame against work carried by the table.

A further object of this invention is the provision of a mechanism for holding and pre-heating work to be welded, having adjustable shields adapted to be positioned relative to the flame and work to facilitate proper heating of the work and to protect the welding mechanism from too intense heat during the welding operation.

Other objects are the provision of a mechanism that increases to a large degree the speed of operation; that operates to make possible a more uniform and dependable weld; and that is adjustable to pre-heat and handle many types of work.

Many other objects will appear during the course of the specification, wherein reference will be had to the drawings, in which:

Fig. 2 is a plan view of the machine with parts broken away.

Fig. 3 is an enlarged, fragmentary, sectional view of the table supporting mechanism.

Fig. 4 is a sectional view taken on line IV—IV of Fig. 3.

Fig. 5 is an enlarged, sectional view of the work securing means.

Fig. 6 is an elevation of one of the burners partly in section.

Fig. 7 is an elevation of the burner, and,

Fig. 8 is an enlarged section taken on line VIII—VIII of Fig. 1.

Figure 1:
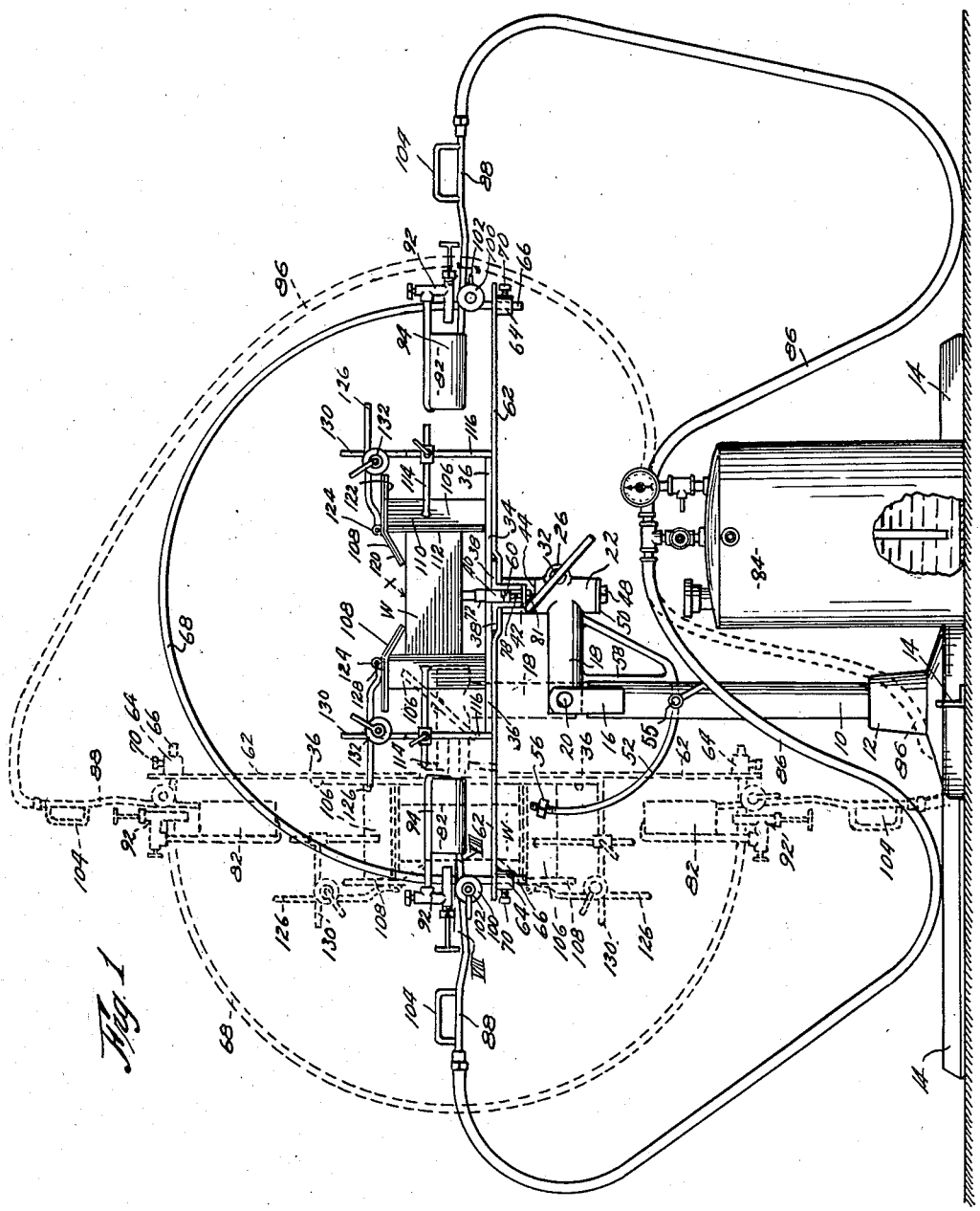
Figure 1 is an elevation of the machine with parts broken away, and with certain of the parts shown in dotted lines in an adjusted position.

Throughout the several views, like characters refer to similar parts and the numeral 10 designates a standard, having a base member 12 into which is fitted a series of radial foot pieces 14. These foot pieces extend a sufficient distance from the center of the standard to prevent accidental tipping of the device when in operation.

The upper end of 10 is provided with ears 16, between which is pivoted the T-member 18, by means of pin 20, as clearly shown in Figs. 1 and 3. The transverse head 22 of 18 is of tubular form split along one side, as at 24, and having ears 26, one of which is drilled and threaded at 28, while the other has an opening 30 through which the screw clamp member 32 is fitted to engage the screw threads to cause the ears to move toward and from each other.

A table 34, having two spaced-apart leaf members 36, is secured together by means of two spaced-apart parallel angle bars 38 which are secured to the adjacent edges of 36 and extend beyond the leaf member at both sides thereof and are joined together by blocks 40 positioned respectively at the adjacent extremities of the bars 38. These blocks may be welded or otherwise secured to the bars.

Extending perpendicularly to the lower, central portion of the table is a cylindrical trunnion 42, adapted to fit into head 22 to permit rotation of the table when the screw clamp member is loosened, and to secure the table in a fixed position when the screw is tightly set. Trunnion 42 is offset to form a shoulder 44 against which one end of head 22 rests while the lower end is provided with an internally threaded crossbar 46, adapted to receive a screw 48, to secure a washer 50 against the other end of 22 to affix the table to T-member 18.

Securely attached to T-member 18, by welding or otherwise, is an arcuate bar 52, having a radius with pin 20 as its center. This bar passes through holes 54 formed through the walls of standard 10 and is provided adjacent its free end with an adjustable stop nut 56. A brace arm 58 for bar 52 serves as a stop to limit the downward movement of the table when it is in the horizontal position, as shown in full lines in the several views, while the nut 56 serves to limit the swinging movement of the table when it is moved to the vertical position, as shown by dotted lines in Fig. 1.

A set screw 55, carried by standard 10, engages 52 to secure it in position and prevent accidental tipping of the table. Extending outwardly from the table and at right angles to slot 60 formed between leaf members 36 are oppositely disposed arms 62. These arms are provided at their opposite ends with bosses 64, through which the end extremities 66 of a semi-circular rod 68 are inserted and secured by means of set screws 70. When so secured, 68 will extend above and across table 34, with its radius half way intermediate its ends substantially coinciding with the axes perpendicular to the center of the table.

The extremities 66 of the rods extend tangentially to the arcuate portion of 68 and are in parallel relation so that 68 may be adjusted toward and from the table to accommodate different work to be welded.

The work or piece to be welded is secured to the table in the following manner. Let W represent the head of an automobile engine as shown in Figs. 1 and 5. A rectangular block 72, having a longitudinal hole 74 formed therethrough, is adapted to fit in slot 60 and rest on ledges 76 so that it can be adjusted longitudinally of the slot. A bolt 78 extends through hole 80 formed through the sleeve 85 which is a part of and rigidly secured to head W, the block 72 and slot 60 and is provided at its lower threaded end with a washer 81 and nut 83. Washer 81 rests against bars 38, and the head of bolt 78 rests against the outer end of sleeve 85, which is securely affixed to head W so that when the nut 83 is tightened on bolt 78, the several parts just described will be definitely drawn together, thereby making it possible to securely clamp the work in position on said table.

A plurality of these blocks and bolts may be provided to support the work where it is found necessary. Two are sufficient for supporting the engine head. It is very apparent that many ways of securing the work to the table might be provided to accommodate different shapes. With the blocks longitudinally adjustable in slot 60, it is evident that the position of the fracture in the head can be placed in alignment with the plane of the arcuate member 68.

Mounted on member 68, is a burner 82 of the blow torch type; however, other types of burners might be used without departing from the invention. The burner is supplied with fuel, such as gasoline, from a fuel pressure tank 84, through flexible hose 86 to tube 88, which is coiled at 90, see Fig. 6, then extends to the burner head 92 where it is fed to the burner casing 94 through opening 96 controlled by valve 98. This burner and associated tube is constructed as shown for the purpose of directing the heat from the burner against the coiled portion 90 of the tube 88 so as to pre-heat the fuel contained therein to form a gas suitable for proper combustion. Furthermore, the screen shown in the burner head 92 will eliminate any objectionable materials in the fuel and also function to break up said fuel as it passes therethrough. It will be observed that two of these burners are shown, but others might be added if needed.

Tube 88 is clamped to rod 68 by means of clamping member 100, clearly shown in Fig. 8. By simply loosening nut 102, the burner may be adjusted on the rod and then reset in any predetermined position. The handhold 104 on tube 88 is convenient in the adjustment of the parts.

The burners as shown are positioned substantially diametrically opposite each other and will direct the flame against the opposite sides of the engine block W. By moving the burners along rod 68, the flame might be directed to different parts of the work, furthermore, a pivoting of the burner on the rod would allow for the directing of the flame at an angle to the plane of the semi-circular rod 68, which might be desirable in certain instances.

It has been found advantageous to provide means whereby the heat is controlled at the work, and this is accomplished by means of side shields 106 and top shields 108. The side shields 106 comprise metal plates 110, faced with asbestos 112 having outwardly extending support rods 114 which are adjustably secured to standards 116 by means of clamps 118. The top shields 108 are made of an angled metal sheet 120, lined with asbestos 122, and provided with ears 124 to which is hingedly secured arm 126 by means of pin 128. Arm 126 is adjustably secured to standard 130 by means of a clamp 132. Referring to Figs. 1 and 2, it will be observed that the shields 106 are positioned with their outer ends extending inwardly toward the work W, while their inner ends are in spaced-apart relation to each other, also top shield 108 rests on the top edge of shields 106 and extends over the work.

The opening formed between shields 106 permits the entrance of the flame which is confined to a certain degree to facilitate proper heating of the work. The fracture to be welded is positioned outside the area enclosed by the shields, as at X so that during the welding operation the welding point will be shielded from direct heat of the flame. In most instances the heat from burners will be continued during the welding operation and may be extended thereafter, if it is needed to control proper contraction of the heated parts.

When the machine is set as shown in full lines in Figs. 1 and 2, and the work in place, the table may be rotated in either direction through as much as 360 degrees in order to present the work in proper position to the workman; furthermore, the table may be tilted through 90 degrees on pin 20 to station the parts as shown in dotted lines of Fig. 1. When so tilted the entire table may be rotated through a sufficient arc to position any one of the four sides of W in a horizontal plane at the upper side of the work.

To illustrate more definitely the welding operation while the burners are in use, it will be understood that the weld to be made is between the valve recesses of the engine head at the point marked X. Head W is pre-heated to the desired temperature, while the table is in the horizontal position, the fracture in the surface parallel with the table surface is then welded, after which the table is tilted to a vertical plane and the fracture extending along the upper side wall transversely to the first surface mentioned is then welded. Should the fracture extend to another surface disposed transversely to said first side, then the table is rotated until this side is at the top and in a substantially horizontal position where it can be easily and quickly welded. During the entire welding operation the burners may be in use to maintain the proper heat of that part of the work adjacent the weld, so as to prevent uneven stresses in the work that might prove detrimental. Furthermore, the welding tool will be protected from the pre-heating flame by shields 108.

Should there be more fractures in the same engine head after the first fracture is welded, the head can be moved along slot 60 to position the next fracture in proper relation with the burners and the operation repeated. This operation may be repeated as often as necessary.

It is very apparent that work of any shape could be pre-heated and positioned for welding by this machine by simply altering the work holding means and the shape of the shields when necessary to obtain their proper functioning. When the position of the table is changed it is necessary to first loosen the securing parts and then retighten them before proceeding with the next welding operation.

Having thus described the invention, what is claimed as new and desired to be secured by Letters Patent is:

1. A work handling and pre-heating mechanism for welding comprising a support; an adjustable table carried by said support, having work-securing means; an arched burner supporting member carried by and extending above and across said table; a burner having clamping means adapted to engage said supporting member to direct a flame toward the work mounted on said table; and flexible means to supply fuel to said burner.

2. A work handling and pre-heating mechanism for welding, comprising a standard; a table hingedly and rotatably carried by said standard; means for securing said table in a predetermined position; means whereby work is secured to said table; adjustable shields adapted to be positioned to control the heat above said work; burners adjustably mounted on a curved bar carried by said table and movable therewith adapted to direct flames against said work and toward a common central point; and means for feeding fuel to said burners.

3. A work handling and pre-heating mechanism for welding, comprising a single standard; a table hingedly and rotatably carried by said standard; means for adjustably securing said table in a predetermined position relative to said standard; means whereby work is adjustably secured to said table; burners adjustably carried by an arcuate rod extending above said table and adapted to be adjusted to direct flames against a common zone of said work; and means for feeding fuel to said burners.

4. A work handling and pre-heating mechanism for welding, comprising a standard; a table hingedly and rotatably carried by said standard; means for securing said table in a predetermined position; a semi-circular burner support extending across and carried by said table; securing means whereby work is affixed to said table at substantially the center of said semi-circular support; a burner slidably mounted on said support adapted to continually direct a flame on said work as it is moved entirely around said semi-circular support; and means to supply fuel to said burner.

5. A work handling and pre-heating mechanism for welding comprising a standard; a table adjustably carried by said standard; a semi-circular burner support extending across and carried by said table; a plurality of radially disposed burners adjustably carried by said semi-circular support adapted to be relatively positioned anywhere on said support to direct flames to a common center; and means to supply fuel to said burners.

6. A work handling and pre-heating mechanism for welding comprising a standard; a table adjustably carried by said standard; means for securing work to said table; burners adjustably mounted on a slide bar extending away from and carried by said table adapted to direct flames toward said work from opposite directions; adjustable shields carried by said table to selectively direct the flame to certain predetermined parts of said work; and means to deliver fuel to said burners.

7. A work handling and preheating mechanism for welding comprising a standard; a table hingedly and rotatably carried by said standard; securing means whereby work is fixed relative to said table whereby said table is adjustable to selectively position the various surfaces of said work at the top side; burners mounted on a common slide bar, carried by said table and adjustable toward and from the same; and flexible conduits whereby fuel is fed from the container to said burners.

ROY PETERSON.